(12) United States Patent
Koteyar et al.

(10) Patent No.: US 11,956,441 B2
(45) Date of Patent: Apr. 9, 2024

(54) IDENTIFYING LONG TERM REFERENCE FRAME USING SCENE DETECTION AND PERCEPTUAL HASHING

(71) Applicant: ATI Technologies ULC, Markham (CA)

(72) Inventors: Sunil Gopal Koteyar, Burlington (CA); Sonu Thomas, Markham (CA); Ihab M. A. Amer, Markham (CA); Haibo Liu, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/561,275

(22) Filed: Dec. 23, 2021

(65) Prior Publication Data

US 2023/0209064 A1    Jun. 29, 2023

(51) Int. Cl.
| | |
|---|---|
| *H04N 19/136* | (2014.01) |
| *H04N 19/105* | (2014.01) |
| *H04N 19/142* | (2014.01) |
| *H04N 19/167* | (2014.01) |
| *H04N 19/172* | (2014.01) |
| *H04N 19/423* | (2014.01) |

(52) U.S. Cl.
CPC ......... *H04N 19/136* (2014.11); *H04N 19/105* (2014.11); *H04N 19/142* (2014.11); *H04N 19/167* (2014.11); *H04N 19/172* (2014.11); *H04N 19/423* (2014.11)

(58) Field of Classification Search
CPC .. H04N 19/105; H04N 19/136; H04N 19/142; H04N 19/167; H04N 19/172; H04N 19/423
See application file for complete search history.

(56) References Cited

U.S. PATENT DOCUMENTS

| | | | | |
|---|---|---|---|---|
| 6,542,547 | B1 * | 4/2003 | Wong | H04N 19/51 |
| | | | | 375/E7.104 |
| 8,897,512 | B1 * | 11/2014 | Bozinovic | G06F 16/783 |
| | | | | 382/103 |
| 11,232,685 | B1 * | 1/2022 | Nixon | H04N 7/186 |
| 11,449,584 | B1 * | 9/2022 | Pamucci | H04L 9/0897 |
| 2009/0262804 | A1 * | 10/2009 | Pandit | H04N 19/51 |
| | | | | 375/E7.243 |
| 2010/0177893 | A1 * | 7/2010 | Jeon | H04N 19/44 |
| | | | | 380/239 |
| 2012/0087583 | A1 * | 4/2012 | Yang | G06F 16/7847 |
| | | | | 382/218 |
| 2013/0148721 | A1 * | 6/2013 | Chen | G09G 5/001 |
| | | | | 375/E7.243 |

(Continued)

*Primary Examiner* — Jeremiah C Hallenbeck-Huber
(74) *Attorney, Agent, or Firm* — Volpe Koenig

(57) ABSTRACT

Methods and devices are provided for encoding a video stream which comprise encoding a plurality of frames of video acquired from different points of view, generating statistical values for the frames of video determined from values of pixels of the frames, generating, for each of the plurality of frames, a perceptual hash value based on statistical values of the frame and encoding a current frame comprising video acquired from a corresponding one of the different points of view using a previously encoded reference frame based on a similarity of perceptual hashes of the current frame and the previously encoded reference frame.

20 Claims, 5 Drawing Sheets

(56) References Cited

U.S. PATENT DOCUMENTS

| | | | |
|---|---|---|---|
| 2014/0104383 A1* | 4/2014 | Yoshitomo | H04N 13/161 |
| | | | 348/43 |
| 2017/0093854 A1* | 3/2017 | Nelson | H04N 1/00 |
| 2017/0163999 A1* | 6/2017 | Li | H04N 19/52 |
| 2017/0289573 A1* | 10/2017 | Yoo | H04N 19/70 |
| 2017/0302936 A1* | 10/2017 | Li | H04N 19/503 |
| 2018/0014012 A1* | 1/2018 | Yu | H04N 19/159 |
| 2019/0377971 A1* | 12/2019 | Song | G06V 10/44 |
| 2021/0104018 A1* | 4/2021 | Moon | G06T 3/4053 |
| 2021/0392346 A1* | 12/2021 | Holcomb | H04N 19/136 |
| 2022/0300549 A1* | 9/2022 | Bodziony | G06F 16/583 |

* cited by examiner

IDENTIFYING LONG TERM REFERENCE FRAME USING SCENE DETECTION AND PERCEPTUAL HASHING

BACKGROUND

Video compression uses different coding techniques to reduce amounts of video data (e.g., redundant data) to encode between successive frames of a video stream. For example, because the difference between frames of video is typically the result of either movement of a camera or movement of an object in the frame (resulting in successive video image frames being very similar), motion searching is employed to facilitate the encoding of the video data for video compression (taking advantage of the temporal redundancy between frames). Motion searching attempts to predict a current frame in a video stream based on previous and/or future frames by accounting for motion of a camera and/or objects in the video.

BRIEF DESCRIPTION OF THE DRAWINGS

A more detailed understanding can be had from the following description, given by way of example in conjunction with the accompanying drawings wherein.

DETAILED DESCRIPTION

Figure 1:
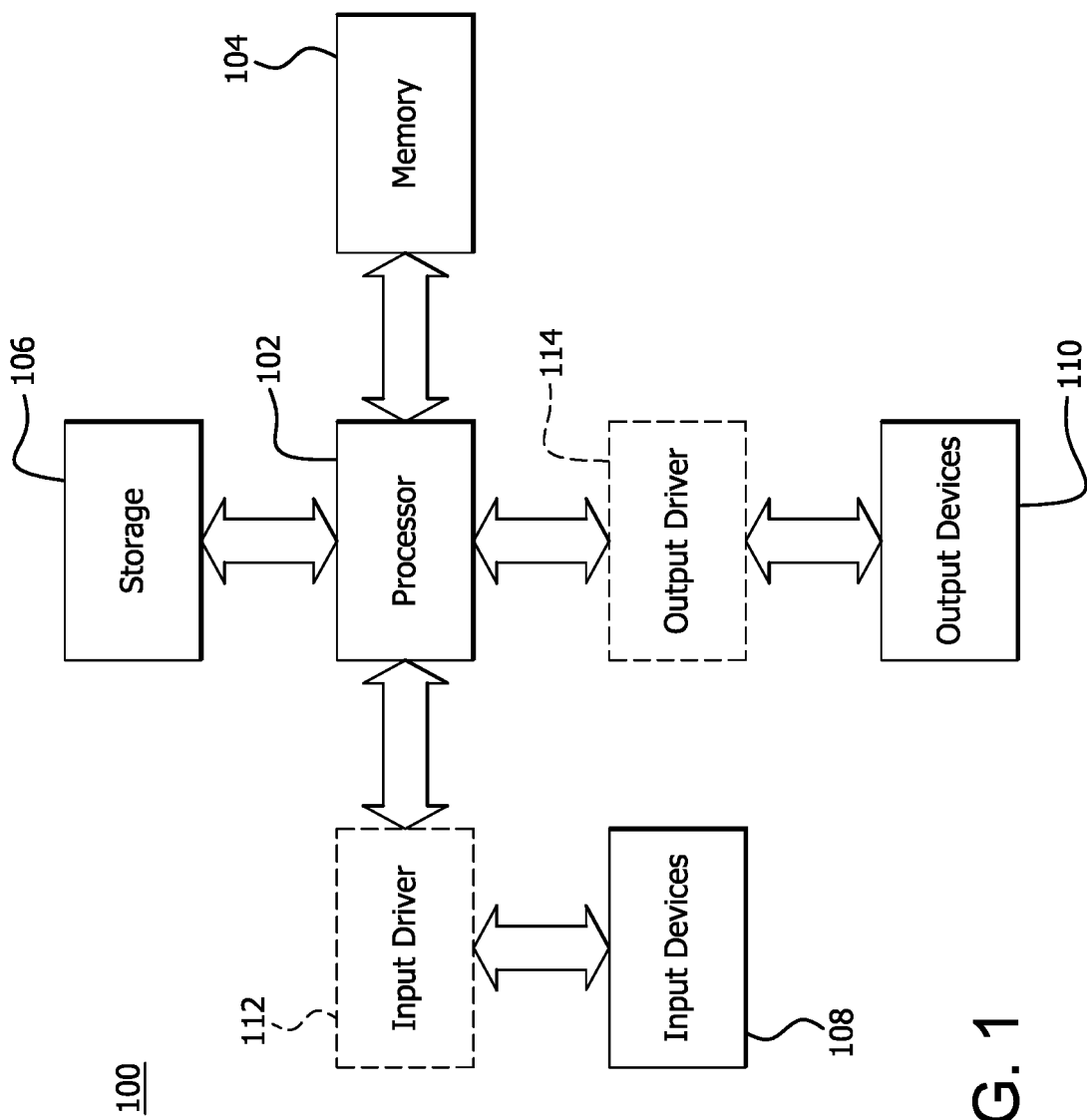
FIG. 1 is a block diagram of an example device in which dynamic reloading of a motion estimation search window is implemented.

Motion-compensated prediction includes estimating the motion of portions (e.g., blocks of pixels, such as macroblocks) between frames (e.g., between current frame to be encoded and a previously encoded reference frame) by searching for matching portions (e.g., a matching or similar block) around co-located portions in the reference frame (i.e., portions at the same location in the reference frame). The matching portion of the reference frame is used as a predictor to encode the portion of the current video frame being encoded. That is, motion-compensated prediction exploits the temporal correlation between frames of a video stream to estimate the motion of between frames.

In some video streams, the temporal correlation is lost between successive frames of a portion of video (i.e., captured) acquired from a point of view. For example, the temporal correlation can be lost between successive frames of a portion of video acquired from a point of view of a live sporting event when the video acquired from a first point of view of a first camera switches to acquiring video from one or more other points of view of other cameras (e.g., a second point of view of second camera) and then switches back to acquiring the video from the first point of view of the first camera. In conventional video encoding, when the acquired video switches back to the first point of view (e.g., the first camera), the current frame cannot employ motion-compensated prediction because the temporal correlation is lost between the video frame previously acquired from the first point of view (e.g., before switching from the first camera to the second camera) and the current video (e.g., after switching back to the first camera).

A brute force technique of comparing each of the pixels (e.g., each block of pixels) of a previously encoded frame to blocks of pixels of a current frame could be used to determine whether a previously encoded frame is acquired from the same point of view as the current frame. However, comparing blocks of pixels between frames to make these determinations is time consuming and expensive.

Features of the present disclosure provide efficient techniques for encoding and decoding portions of video acquired from different points of view over time. Features of the present disclosure generate metadata, which include statistics and a perceptual hash, for frames of different portions of video acquired, over time, from different points of view. The perceptual hash identifies a frame of video being encoded as a frame acquired from one of the different portions of video (i.e., from one of the different points of view). When the acquiring of one of the different portions of video resumes, after a period of time during which one or more of the other portions of the video stream are acquired, the metadata (e.g., perceptual hash) generated for the frames of the different portions of video is compared to the metadata generated for the current frame of the portion of video being acquired to determine whether one of the frames of the different portions of video is acquired from the same point of view (i.e., matches) as the current frame being encoded. When a match is determined, the current frame is encoded by using the matching frame as a reference frame. When a match is not determined for any of the frames, the frame is encoded without a reference frame.

A method of encoding a video stream is provided which comprises encoding a plurality of frames of video acquired from different points of view, generating statistical values for the frames of video determined from values of pixels of the frames, generating, for each of the plurality of frames, a perceptual hash value based on statistical values of the frame and encoding a current frame comprising video acquired from a corresponding one of the different points of view using a previously encoded reference frame based on a similarity of perceptual hashes of the current frame and the previously encoded reference frame.

A processing device for encoding a video stream is provided which comprises memory and a processor. The processor is configured to encode a plurality of frames of video acquired from different points of view, generate statistical values for the frames of video determined from values of pixels of the frames, generate, for each of the plurality of frames, a perceptual hash value based on statistical values of the frame and encode a current frame comprising video acquired from a corresponding one of the different points of view using a previously encoded reference frame based on a similarity of perceptual hashes of the current frame and the previously encoded reference frame.

A method of encoding a video stream is provided which comprises encoding a current frame of video acquired from a first point of view generating statistical values for the current frame determined from values of pixels of the frame, generating, for the frame, a perceptual hash comprising an array of values determined from the statistical values of the frame and identifying the current frame as a frame which comprises video acquired from the first point of view, comparing the perceptual hash of the current frame to perceptual hashes of previously encoded frames, encoding the current frame using one of the previously encoded reference frames when the perceptual hash of the current frame matches the perceptual hash of the one previously encoded frame and encoding the current frame without using one of the previously encoded reference frames when the perceptual hash of the current frame does not match the perceptual hashes of the previously encoded frames.

FIG. 1 is a block diagram of an exemplary device 100 in which dynamic reloading of a motion estimation search window is implemented. The device 100 can include, for example, a computer, a gaming device, a handheld device, a set-top box, a television, a mobile phone, or a tablet computer. The device 100 includes a processor 102, memory 104, a storage 106, one or more input devices 108, and one or more output devices 110 (e.g., an output port, a display, etc.). The device 100 also includes an input driver 112 and an output driver 114. It is understood that the device 100 can include additional components not shown in FIG. 1.

The processor 102 can include a CPU, a GPU, a CPU and GPU located on the same die, or one or more processor cores, wherein each processor core can be a CPU or a GPU. Memory 104 can be located on the same die as the processor 102, or can be located separately from the processor 102. Portions of memory 104 include volatile and non-volatile memory, for example, random access memory (RAM), dynamic RAM, or a cache.

Types of storage 106 include a fixed or removable storage, for example, a hard disk drive, a solid state drive, an optical disk, or a flash drive. Example input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Example output devices 110 include a display, a display port (e.g., an HDMI port/connection, a DisplayPort port/connection), a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
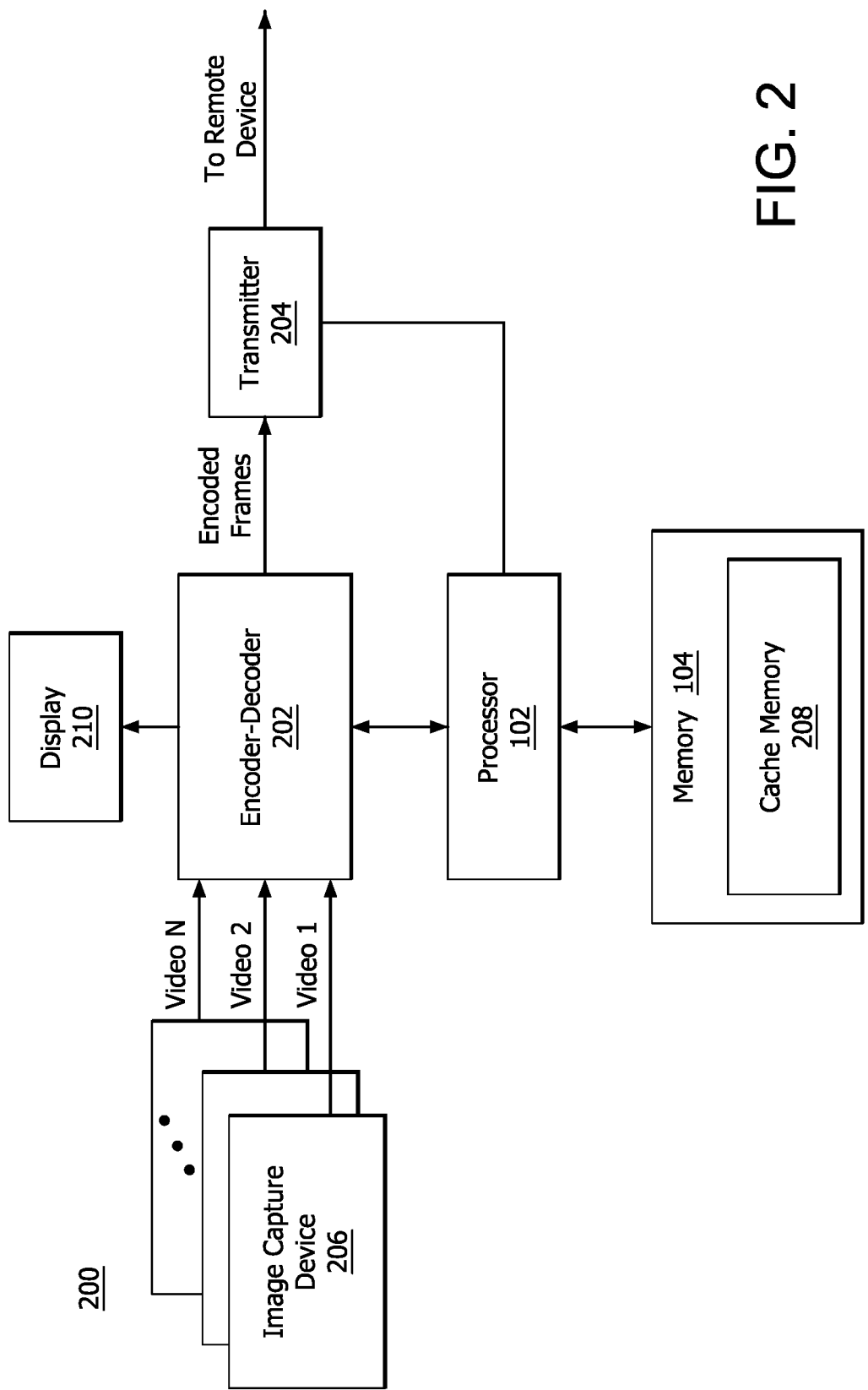
FIG. 2 is a block diagram illustrating exemplary processing apparatus components used to dynamically reload a motion estimation search window.

FIG. 2 is a block diagram illustrating exemplary components of a processing device 200 in which one or more features of the disclosure can be implemented. Processing device 200 is used to process, encode (compress) and decode (decompress) frames of video, generate statistics or properties of the video frames and generate perceptual hashes from the statistics or properties of the video frames as described in more detail below.

As shown in FIG. 2, processing device 200 comprises processor 102, encoder-decoder 202, a transmitter 204, a plurality of image capture devices 206 (e.g., cameras) and memory 104.

Each portion of video of a video stream to be encoded represents images from a different point of view. In the example shown in FIG. 2, each portion of video (i.e., video 1, video 2 . . . video N) is acquired by one of the image capture devices 206 and are provided to the encoder 202. For example, each portion of video can be images from a different camera at a live sporting event or for movie editing acquiring video from different angles and different scenes. The image capture devices 206 shown in FIG. 2 are merely used as an example. Features of the present disclosure can be implemented without cameras acquiring the different portions of video. For example, the video stream can include different views of a virtual world in a video game.

As shown in FIG. 2, processor 102 is in communication with encoder-decoder 202, transmitter 204, and memory 104, which includes cache memory 208 local to encoder-decoder 202. Processor 102 is configured to control the encoder-decoder 202 to perform various tasks, as described herein.

In the example shown at FIG. 2, an encoder and a decoder are illustrated as a single component (e.g., a CODEC). Features of the present disclosure can be implemented, however, via a separate encoder and decoder. The encoding and decoding are, for example, implemented in hardware, software or a combination of hardware and software to compress data for executing a program.

Encoder-decoder 202 is configured to receive video frames (e.g., video 1, video 2 . . . video N), such as video frames acquired, over time, by the image capture devices 206 from different points of view. Alternatively, the video frames are acquired from different points of view in a virtual world of a video game (e.g., application).

Encoder-decoder 202 is configured to receive instructions from processor 102 to encode (e.g., compress via motion-compensated prediction) video frames, generate statistics or properties of the video frames and generate perceptual hashes from the statistics or properties of the video frames according to features of the disclosure, as described in more detail below.

Encoder-decoder 202 is also configured to decode (e.g., decompress) the video frames. For example, as described below, the video frames are encoded via metadata information, including one or more encoding algorithms used to encode the frames, information indicating whether or not a previously encoded frame was used as a reference frame to encode the current frame, information that identifies the encoded frame used as the reference frame, statistics or properties of the frames and the perceptual hash values generated during the encoding.

In some implementations, the encoder-decoder 202 is configured to provide the encoded video frames to transmitter 204 to be sent for decoding and display on a remote device. The encoded video frames are sent, for example, to display device 210 separate from processing device 200 over a wired or wireless network. Alternatively, the processing device 200 includes a display for displaying the video frames. The encoded video frames are sent, for example, via a network interface controller (NIC) over one or more networks (e.g., local area network), including wired (e.g., Ethernet) or wireless networks (e.g., via WiFi, Bluetooth, and other wireless standards). Alternatively, the processing device 200 includes a display for displaying the decoded video frames.

As described above, when the temporal correlation is lost between frames, conventional video encoding techniques are unable to efficiently encode and decode different portions of video acquired, over time, from different points of view. A brute force technique of comparing each of the pixels (e.g., each block of pixels) of a previously encoded frame to blocks of pixels of a current frame could be used to determine whether a previously encoded frame is acquired from the same point of view as the current frame. However, comparing each of the pixels between frames to make these determinations is time consuming and expensive (e.g., comparing two high definition frames of 1000×1000 pixels results in a comparison of 1,000,000 values to another 1,000,000 values).

Features of the present disclosure provide efficient techniques for encoding and decoding portions of video acquired from different points of view over time via metadata, which includes statistics and a perceptual hash, for frames of different portions of video acquired from different points of view. The perceptual hash accurately and efficiently determines frames acquired from the same point of view via a comparison of a number of values (e.g., 64 values or bits) that is much less than the large number of values resulting from a comparison each of the pixels between frames.

Figure 3:
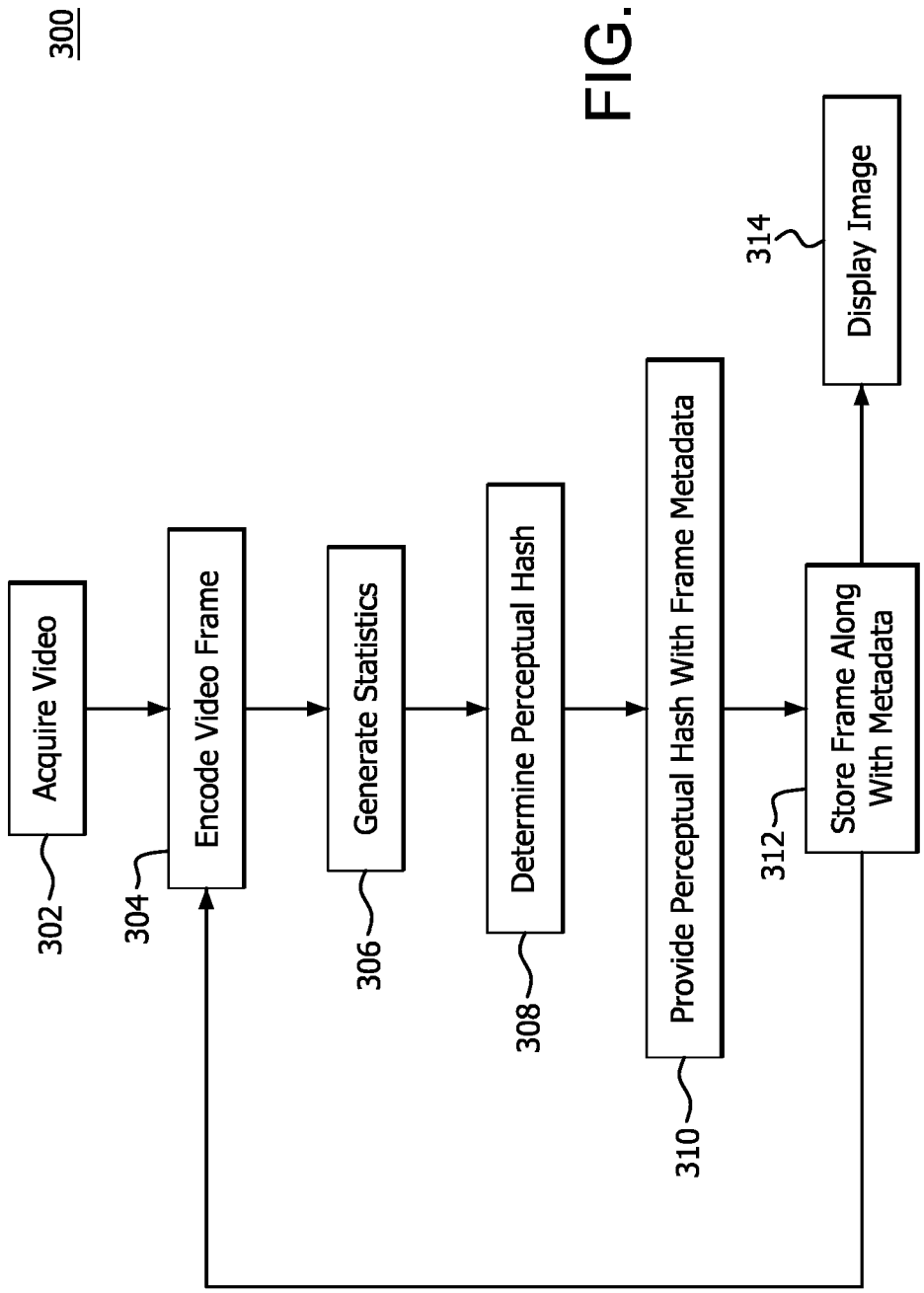
FIG. 3 is a flow diagram illustrating an example method of generating a perceptual hash for use with encoding a video stream according to features of the present disclosure.

FIG. 3 is a flow diagram illustrating an example method of generating a perceptual hash for use with encoding a video stream. As shown at block 302, the method 300 comprises acquiring video images, over time, from different points of view. For example, different portions of video are acquired a plurality of cameras each configured to acquire a different portion of video (e.g., of a live sporting event) from a different point of view. Alternatively, the video images are acquired from one of a plurality of points of view in a virtual world of a video game (e.g., application).

As shown at block 304, each video frame is encoded (e.g., by an encoder or encoder-decoder 202) according to one of a plurality of video encoding (compression) techniques. Various encoding statistics are determined as part of the encoding process. Examples of encoding statistics determined as part of the encoding process, include but are not limited to, an average luminance and/or chrominance values of the pixels of a frame, average luminance values of a block of pixels of a frame, a variance of the pixels of a frame and motion between frames (e.g., motion vectors).

As shown at block 306, a plurality of statistics are generated for use as a plurality of 1-dimensional values of a vector array for generating the perceptual hash. For example, the statistics include a number of the encoding statistics determined as part of the encoding process described above.

In addition to these encoding statistics, additional post-encoding statistics are calculated and added to the values of the array to further identify whether a current frame and a previously encoded frame are acquired from the same point of view. Additional encoding statistics that are not determined as part of the encoding process include, for example, average values or differences in values of particular portions of a frame (e.g., four corner blocks of a frame). By way of example, a vector array of 16 values can include 12 encoding statistics as values and 4 post-encoding generated values. Any number of encoding statistics values and post-encoding generated values can be used to implement features of the present disclosure.

Each value for the vector array is normalized (e.g., assigned a value between 0 and 1), such that each value becomes a one-dimensional value representing the vector array of values.

As shown at block, 308, the array of values are passed through a hash function to provide a perceptual hash value. That is, in the example above, each of the 16 values, including the 12 values determined as part of the encoding process and each of the 4 post-encoding generated values are passed through a hash function to provide the 12 dimensional perceptual hash value. It should be noted that in certain embodiments not every frame has a perceptual hash value calculated. The perceptual hash value may be calculated periodically (e.g., every nth frame) or when it is determined that there has been a scene change (e.g., a switch between image sources (e.g., a camera switch). There are techniques known to those skilled in the art for determining a scene change.

As shown at block 310, the perceptual hash is provided (e.g., attached) as metadata of the frame to identify a frame of video as corresponding to a frame acquired from one of the different points of view.

The frame (e.g., pixel data and motion data) and metadata (e.g., the perceptual hash identifying the frame) are stored, at block 312, for later use to determine frames acquired from the same point of view, as described below with regard to FIG. 4. The metadata for each frame can be stored in any portion of memory 104 (e.g., cache memory 208). The frame is displayed at block 314 as an image and the method 300 proceeds back to block 304 to encode the next video frame.

Figure 4:
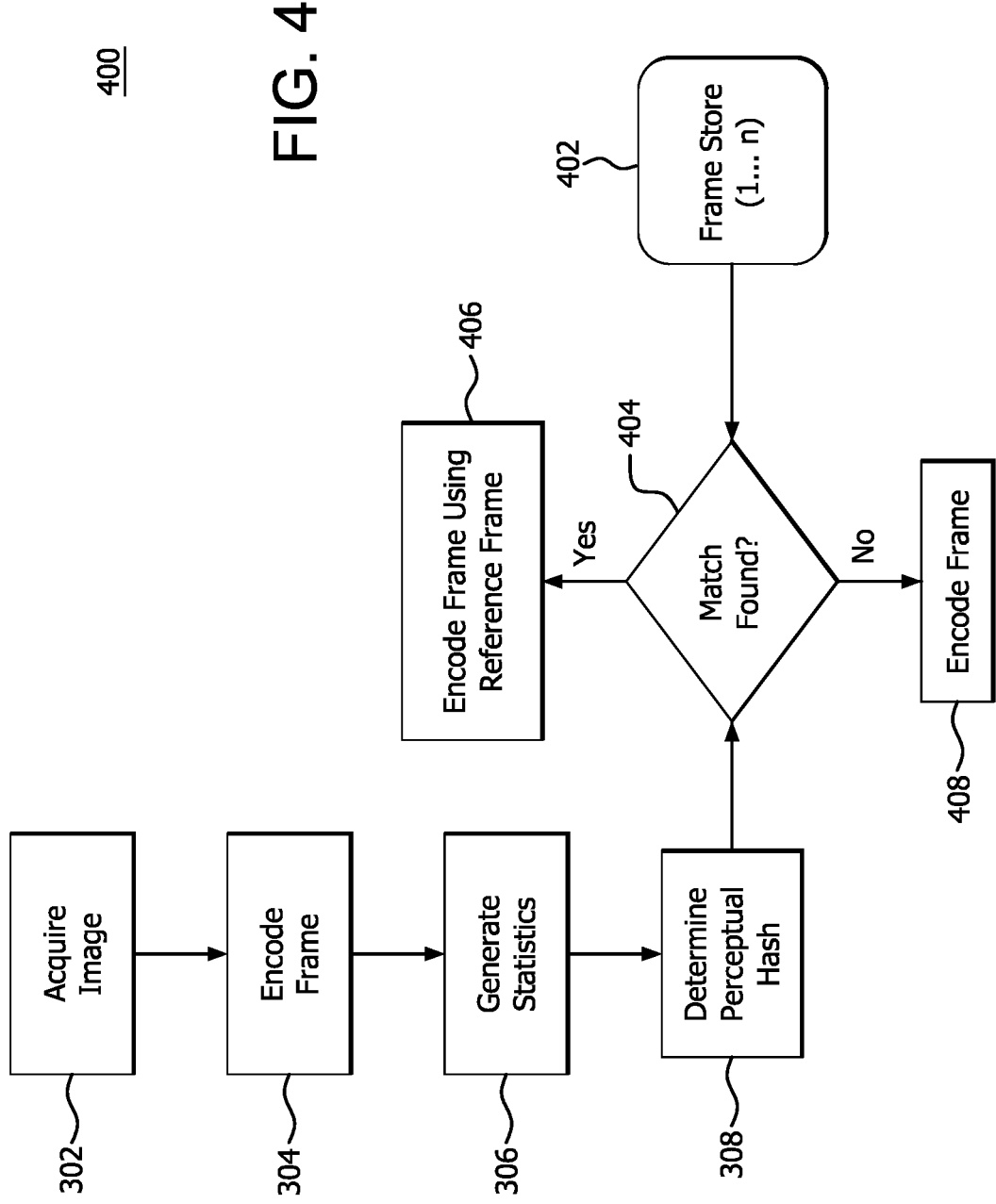
FIG. 4 is a flow diagram illustrating an exemplary method of using a perceptual hash to encode a current video frame using a previously encoded reference frame having a temporal correlation according to features of the present disclosure.

FIG. 4 is a flow diagram illustrating an example method 400 of using a perceptual hash to encode video frames acquired from different points of view according to features of the present disclosure.

Blocks 302-308 are the same as those shown in FIG. 3 and described above. Accordingly, detailed description of these blocks is omitted from being superfluous.

When encoding a current frame which acquires video from a first point of view, after a period of time during which one or more other frames are encoded that acquire video from at least one other point of view, the perceptual hash that is generated for the current frame at block 308 is compared to one or more of the perceptual hashes (e.g., the metadata) that are generated and stored for the previously acquired frames (i.e., frame store 1 . . . n at block 402) of the different portions of video.

A determination is made, at decision block 404, as to whether a perceptual hash for a previously encoded frame matches the perceptual hash for the current frame. A match is determined, for example, when a difference between the perceptual hash values of two frames is equal to or less than a predetermined value (i.e., for a match to be determined the two perceptual hash values do not need to be equal to each other but can be similar to each other within a predetermined range).

When it is determined that there is a match between the perceptual hashes of two frames (YES decision), the two frames are determined to be frames of video that are acquired from the same point of view and the current frame is encoded using the matching frame as a reference frame, at block 406. For example, the current frame is encoded using the previously encoded frame as a reference frame when a difference between the perceptual hash of the current frame and the perceptual hash of the previously encoded reference frame is equal to or less than a predetermined range.

When a match is not determined between the perceptual hash for the current frame and a perceptual hash of a previously encoded frame, the previously encoded frame is not used to encode the current frame and a perceptual hash of a next previously encoded frame is compared the perceptual hash of the current frame to determine if there is a match and the process continues for the remaining previously encoded frames. When a match is not determined between the perceptual hash for the current frame and a perceptual hash for any of the previously encoded frames (NO decision), the current frame is encoded without a reference frame at block 408. For example, the current frame is encoded without using a previously encoded reference frame when a difference between the perceptual hash of the current frame and the perceptual hash of the previously encoded reference frame is greater than the predetermined range.

Figure 5:
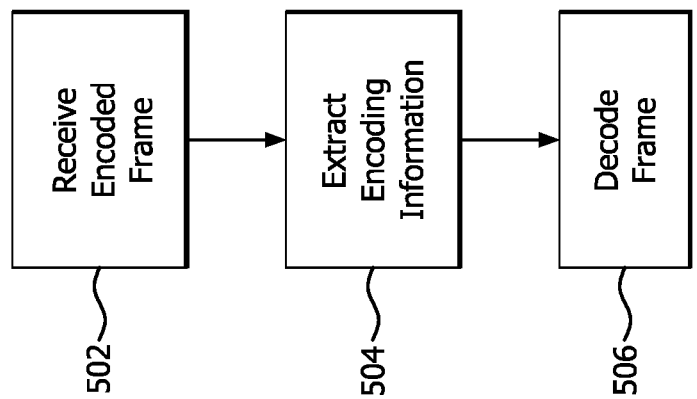
FIG. 5 is a flow diagram illustrating an example method of decoding a video frame encoded according to method illustrated in FIG. 4.

FIG. 5 is a flow diagram illustrating an example method 500 of decoding a video frame, which is encoded according to method illustrated in FIG. 4. As shown at block 502, the method includes receiving an encoded frame. For example, the current frame that was encoded in FIG. 4 is received by processor 102 to be decoded.

As shown at block 504, information used to encode the current frame (i.e., encoding information) is extracted from the video stream to decode the encoded current frame. The encoding information includes, for example, meta data which includes an encoding algorithm used to encode the video frames, information indicating whether or not a previously encoded frame was used as a reference frame to encode the current frame, information that identifies the encoded frame used as the reference frame, statistics or properties of the frames and the perceptual hash values generated during the encoding.

As shown at block 506, the current frame is decoded. For example, the current frame is decoded using the encoding information extracted at block 504. Accordingly, use of the perceptual hash facilitates an improved encoding and decoding process by accurately and efficiently determining frames acquired from the same point of view in which a temporal correlation is lost between successive frames.

It should be understood that many variations are possible based on the disclosure herein. Although features and elements are described above in particular combinations, each feature or element can be used alone without the other features and elements or in various combinations with or without other features and elements.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements motion compensated prediction.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of encoding a video stream, the method comprising:
    encoding a plurality of frames of video acquired from different scenes or different points of view;
    for a frame of the plurality of frames of video, generating a perceptual indicator based on an array of values, generated after the frame is encoded, which comprises a first set of statistical values and a second set of statistical values, different from the first set of statistical values, wherein the first set of statistical values of the array of values and the second set of statistical values of the array of values are determined from values of pixels of the frame; and
    when a first perceptual indicator for a current frame matches a second perceptual indicator of a previously encoded reference frame, encoding the current frame using the previously encoded reference frame.

2. The method of claim 1, wherein the perceptual indicator for the frame is a perceptual hash value determined by passing an array of values, comprising the first set of statistical values and the second set of statistical values, through a hash function, and
    the perceptual hash value identifies the frame as a frame which comprises video acquired from one of the different scenes or one of the different points of view.

3. The method of claim 2, further comprising:
    determining a difference between the perceptual hash value of the current frame and the perceptual hash value of the previously encoded reference frame; and
    encoding the current frame using the previously encoded reference frame when the difference between the perceptual hash value of the current frame and the perceptual hash value of the previously encoded reference frame is equal to or less than a predetermined range.

4. The method of claim 3, further comprising encoding the current frame without using the previously encoded reference frame when the difference between the perceptual hash value of the current frame and the perceptual hash value of the previously encoded reference frame is greater than the predetermined range.

5. The method of claim 3, further comprising:
    storing the perceptual hash value for each of the plurality of frames; and
    comparing the perceptual hash value of the current frame and the perceptual hash value of the previously encoded reference frame to determine the difference between the perceptual hash value of the current frame and the perceptual hash value of the previously encoded reference frame.

6. The method of claim 1, wherein the current frame and the previously encoded reference frame are determined to be frames which acquire video from a same scene or a same point of view.

7. The method of claim 1, further comprising comparing the perceptual indicator of the current frame with perceptual indicators of a plurality of previously encoded reference frames.

8. The method of claim 1, wherein
    the first set of statistical values, generated as part of the array of values after the frame is encoded, is a portion of statistical values determined during the encoding of the frame; and the second set of statistical values, generated after the frame is encoded, comprises statistical values not determined during encoding of the frame.

9. The method of claim 1, wherein the perceptual indicator is stored as metadata for the frame.

10. The method of claim 1, wherein perceptual indicators are generated periodically for a portion of the plurality of frames.

11. The method of claim 1, wherein the perceptual indicator is generated for a first frame of the plurality of frames after a scene change is determined.

12. The method of claim 1, further comprising:
decoding the encoded current frame; and
displaying the decoded current frame on a display.

13. A processing device for encoding a video stream comprising:
memory; and
a processor configured to:
encode a plurality of frames of video acquired from different scenes or different points of view;
for a frame of the plurality of frames of video, generating a perceptual indicator based on an array of values, generated after the frame is encoded, which comprises a first set of statistical values and a second set of statistical values, different from the first set of statistical values, wherein the first set of statistical values of the array of values and the second set of statistical values of the array of values are determined from values of pixels of the frame; and
when a first perceptual indicator for a current frame matches a second perceptual indicator of a previously encoded reference frame, encode the current frame using the previously encoded reference frame.

14. The processing device of claim 13, further comprising an encoder configured to encode the plurality of frames.

15. The processing device of claim 14, further comprising:
a decoder configured to decode the plurality of encoded frames; and
a display device configured to display the plurality of decoded video frames.

16. The processing device of claim 13, wherein the perceptual indicator for the frame is a perceptual hash value determined by passing an array of values, comprising the first set of statistical values and the second set of statistical values, through a hash function, and
the perceptual hash value identifies the frame as a frame which comprises video acquired from one of the different scenes or one of the different points of view.

17. The processing device of claim 16, wherein the processor is configured to:

determine a difference between the perceptual hash value of the current frame and the perceptual hash value of the previously encoded reference frame; and
encode the current frame using the previously encoded reference frame when the difference between the perceptual hash value of the current frame and the perceptual hash value of the previously encoded reference frame is equal to or less than a predetermined range.

18. The processing device of claim 16, wherein the processor is configured to:
store the perceptual hash value for each of the plurality of frames in the memory; and
compare the perceptual hash value of the current frame and the perceptual hash value of the previously encoded reference frame to determine a difference between the perceptual hash value of the current frame and the perceptual hash value of the previously encoded reference frame.

19. The processing device of claim 13, wherein the current frame and the previously encoded reference frame are determined to be frames which acquire video from a same scene or a same point of view.

20. A method of encoding a video stream, the method comprising:
encoding a current frame of video acquired from a first scene or a first point of view;
generating, for the current frame, a perceptual indicator based on an array of values generated after the current frame is encoded, the array of values comprising a first set of statistical values and a second set of statistical values, different from the first set of statistical values, wherein the first set of statistical values of the array of values and the second set of statistical values of the array of values are determined from values of pixels of the current frame and generated after the current frame is encoded;
identifying the current frame as a frame which comprises video acquired from the first scene or the first point of view;
comparing the perceptual indicator of the current frame to perceptual indicators of previously encoded reference frames;
when the perceptual indicator of the current frame matches a perceptual indicator of one of the previously encoded reference frames, encoding the current frame using the one previously encoded reference frame; and
when the perceptual indicator of the current frame does not match any of the perceptual indicators of the previously encoded reference frames, encoding the current frame without using one of the previously encoded reference frames.

* * * * *